(12) United States Patent
Rohan et al.

(10) Patent No.: US 8,230,329 B2
(45) Date of Patent: Jul. 24, 2012

(54) ENTERPRISE-LEVEL TRANSACTION ANALYSIS AND REPORTING

(75) Inventors: Michael L. Rohan, Greenwood Village, CO (US); Rob Blake, Lone Tree, CO (US); Emily Huang, Englewood, CO (US)

(73) Assignee: Rivet Software, Inc., Engelwood, CO (US)

( * ) Notice: Subject to any disclaimer, the term of this patent is extended or adjusted under 35 U.S.C. 154(b) by 960 days.

(21) Appl. No.: 11/688,857

(22) Filed: Mar. 20, 2007

(65) Prior Publication Data

US 2007/0239476 A1    Oct. 11, 2007

Related U.S. Application Data

(60) Provisional application No. 60/785,250, filed on Mar. 22, 2006.

(51) Int. Cl.
G06Q 10/00 (2012.01)
G06F 9/44 (2006.01)
G06F 7/00 (2006.01)
G06F 17/00 (2006.01)

(52) U.S. Cl. ............. 715/234; 703/6; 705/1; 705/7
(58) Field of Classification Search ........... 715/234; 705/1, 7; 703/6
See application file for complete search history.

(56) References Cited

U.S. PATENT DOCUMENTS

| | | | |
|---|---|---|---|
| 5,987,467 A * | 11/1999 | Ross et al. ........................... 1/1 |
| 7,039,871 B2 * | 5/2006 | Cronk ........................... 715/741 |
| 7,165,044 B1 * | 1/2007 | Chaffee ........................... 705/37 |
| 2002/0059183 A1 * | 5/2002 | Chen ........................... 707/1 |
| 2002/0087633 A1 * | 7/2002 | Nelson ........................... 709/204 |
| 2002/0091681 A1 * | 7/2002 | Cras et al. ........................... 707/3 |
| 2003/0041077 A1 * | 2/2003 | Davis et al. ........................... 707/500 |
| 2003/0074358 A1 * | 4/2003 | Sarbaz et al. ........................... 707/10 |
| 2003/0172013 A1 * | 9/2003 | Block et al. ........................... 705/33 |
| 2004/0181378 A1 * | 9/2004 | Gilmore ........................... 703/6 |
| 2005/0144096 A1 * | 6/2005 | Caramanna et al. ........................... 705/30 |
| 2005/0182777 A1 * | 8/2005 | Block et al. ........................... 707/100 |
| 2005/0183002 A1 * | 8/2005 | Chapus ........................... 715/505 |
| 2006/0069981 A1 * | 3/2006 | Enenkiel ........................... 715/500 |

* cited by examiner

*Primary Examiner* — Stephen Hong
*Assistant Examiner* — Marshon Robinson
(74) *Attorney, Agent, or Firm* — Hamilton, DeSanctis & Cha LLP

(57) ABSTRACT

Systems and methods for a multi-level advanced caching engine that is designed for processing a high-volume of transaction data and ensuring high performance query processing is provided. A folio is interactively updated on-demand for an organizational hierarchy with aggregated information from pre-summarized balances. Responsive to user-generated folio-level queries which depend upon balance values not currently stored within the financial transaction system, multiple instances of balances are dynamically created and populated with new balance values based on the user-generated folio-level query. Responsive to new transaction data, clean balance values are maintained within the dependent balances by regenerating the associated balance values. Responsive to a user-generated folio-level query, an instance of a cube is dynamically created and populated having dimensions defined by parameters of the user-generated folio-level query and which aggregates the balance values of the balances into appropriate slices of the cube.

24 Claims, 12 Drawing Sheets

ENTERPRISE-LEVEL TRANSACTION ANALYSIS AND REPORTING

CROSS-REFERENCE TO RELATED APPLICATIONS

This application claims the benefit of priority of U.S. Provisional Application No. 60/785,250, filed on Mar. 22, 2006, which is hereby incorporated by reference in its entirety for all purposes.

This application is related to U.S. patent application Ser. No. 11/163,965, now, U.S. Pat. No. 7,415,482, which is hereby incorporated by reference in its entirety for all purposes.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright© 2006-2011, Rivet Software, Inc.

BACKGROUND

1. Field

Embodiments of the present invention generally relate to business intelligence (BI) systems and systems and methods for performing enterprise-level analysis and reporting of transaction information. More specifically, embodiments of the present invention provide a multi-level advanced caching engine that is designed for processing a high-volume of transaction data and ensuring high performance query processing.

2. Description of Related Art

One of the key issues decision makers in corporations face today is finding out how the business is doing, planning for the future, measuring performance against plan, being able to determine when and how a plan might need to be changed in response to internal and external events and ensuring that the organization meets regulatory requirements. This requires that reports and other financial applications are able to work with data from more than one system and the systems of more than one sub-entity (division, country office, etc.).

Traditionally, databases (namely data marts, data warehouses and Online Analytical Processing (OLAP) cubes that are multi-dimensional) would be the central part of any system implementation that attempts to provide business intelligence for any company to make informed decisions. Traditionally, the BI projects would be information technology (IT)-intensive, and requires substantial upfront time for setting up metadata (data about the numeric values) and continues to require IT involvement in making adjustments to the structure/layout of the data warehouse.

In a typical BI/data warehouse implementation, Extraction, Transformation and Loading (ETL) jobs would be setup to transform diverse data sources; data would be loaded and aggregated based on pre-determined business rules; databases might be replicated so users in different geographical locations (that might not be in the same network) could access data; reports and OLAP cubes would be designed, implemented and maintained by IT staff to support the ever changing business requirements.

The main short-coming of OLAP is that cubes are defined with a constrained and predetermined set of dimensions and hierarchies within those dimensions. It is not usually possible for a non-technical end user to define additional dimension hierarchies nor is it normal for the OLAP server to update itself with new dimensions when and if the underlying transactions indicates that new data attributes are available and that can be used as dimensions.

OLAP dimensionality is constrained because OLAP servers pre-aggregate all or at least most of the data and each new dimension added causes an exponential growth in the size of the aggregate data.

A major disadvantage of the constraints imposed using the approach taken by OLAP servers is that, generally, OLAP cubes are defined using only "first class" dimensions such as time, accounts, product, region. While a user can create a report based on these dimensions, a user cannot create an aggregate based on some other attribute of the data. For example, a dimension of the data may be "Store" and this dimension may have a hierarchy showing a regional aggregation of store data. However, a user may have a requirement to analyze store data grouped by zip code. While zip code may be an attribute of the store, which is available in the underlying transaction data, in the context of the present example, the OLAP user's solution to this problem of being able to consolidate data across zip codes is to ask for a new, permanent, hierarchy to be defined by making zip code a "first class" dimension even though this required aggregation might only be for a temporary purpose and only for a single user.

In view of the foregoing, it would be desirable to have a more flexible system that allows consolidation of data across multiple geographical locations, multiple functional areas and provides a uniform view to users in an enterprise interactively and on a real-time basis without the need for hierarchy redefinition and significant involvement of IT personnel.

SUMMARY

Systems and methods are described for a multi-level advanced caching engine that is designed for processing a high-volume of transaction data and ensuring high performance query processing. According to one embodiment, financial data is hierarchically represented within a financial transaction system by way of a fact data structure, a balance data structure and a cube data structure. The fact data structure stores fact values each of which aggregate multiple transactions. The balance data structure stores balance values each of which aggregate multiple transactions. The cube data structure stores cube slices each of which summarize balance values for a reporting unit of multiple reporting units of an organizational hierarchy. A folio is interactively updated on-demand for the organizational hierarchy with aggregated information from pre-summarized balances. Responsive to user-generated folio-level queries which depend upon balance values not currently stored within the financial transaction system, multiple instances of balance data structures (balances) are dynamically created and populated with the new balance values based on transactions encompassed by the user-generated folio-level query. Responsive to availability of new transaction data upon which one or more of the balance values of the balances depend, clean balance values are maintained within the one or more balances by regenerating the one or more balance values. Responsive to a user-generated folio-level query, an instance of a cube data structure (a cube) is dynamically created and populated having dimensions defined by parameters of the user-generated folio-level query and which aggregates the balance values of the balances into appropriate slices of the cube.

Other features of embodiments of the present invention will be apparent from the accompanying drawings and from the detailed description that follows.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION

Figure 1:
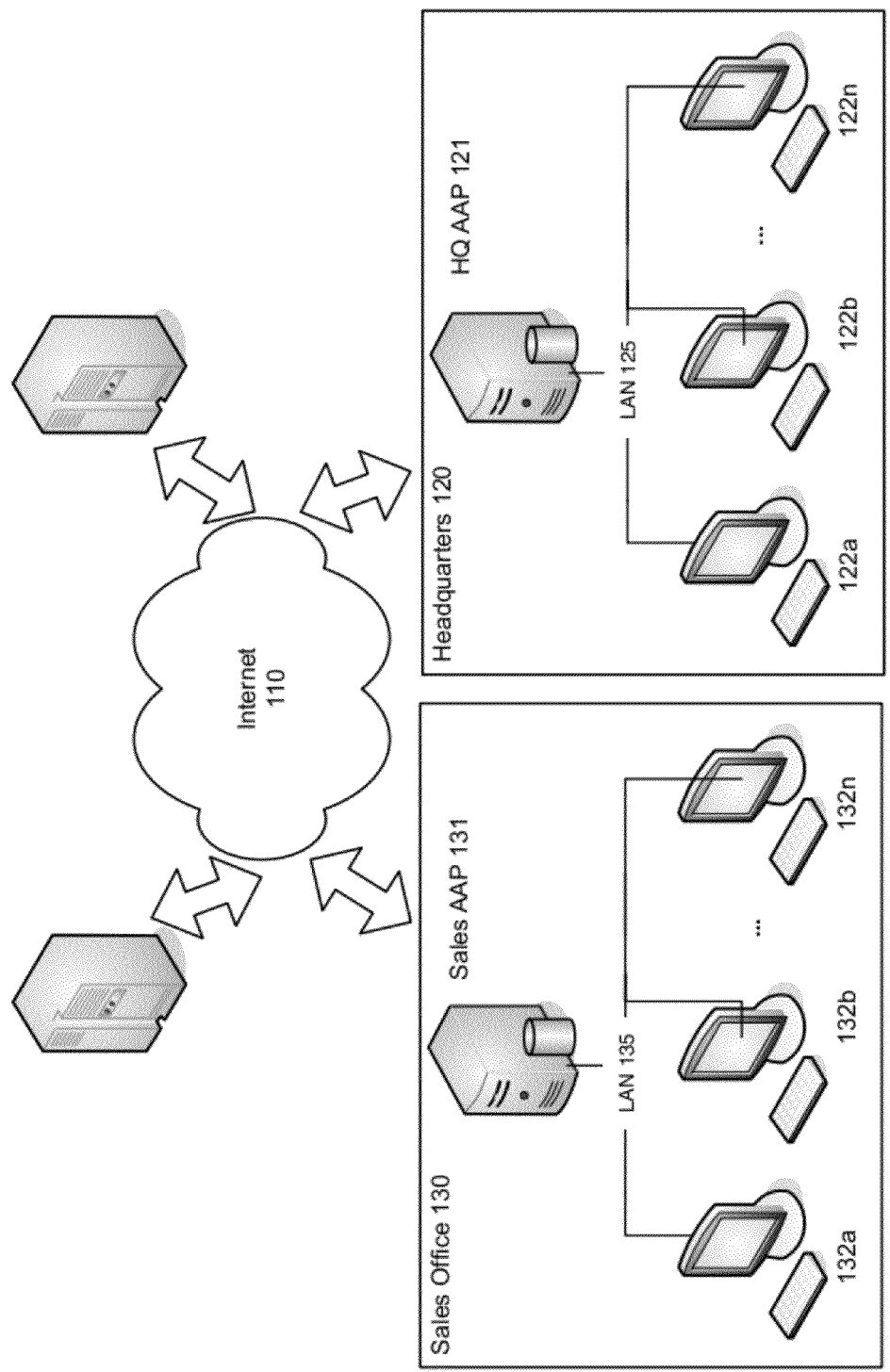
FIG. 1 conceptually illustrates a network environment in which embodiments of the present invention may be employed.

Systems and methods are described for a multi-level advanced caching engine that is designed for processing a high-volume of transaction data and ensuring high performance query processing. According to one embodiment, an enterprise-level analysis and reporting system is designed to break the traditional BI/data warehouse model and is able to consolidate data across multiple geographical locations, multiple functional areas and provide a uniform view to users in an enterprise. In one embodiment, the enterprise-level analysis and reporting system is based on Extensible Markup Language (XML) and its inherent capability of storing information in infinite ways and of having unlimited versions or iterations of such information.

In the following description, for the purposes of explanation, numerous specific details are set forth in order to provide a thorough understanding of embodiments of the present invention. It will be apparent, however, to one skilled in the art that embodiments of the present invention may be practiced without some of these specific details.

Embodiments of the present invention may be provided as a computer program product which may include a machine-readable medium having stored thereon instructions which may be used to program a computer (or other electronic devices) to perform a process. Non-limiting examples of non-transitory machine-readable media that may embody instructions for performing the various methods described herein include floppy diskettes, optical disks, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards and flash memory.

While, for convenience, various embodiments of the present invention may be described with reference to Microsoft Office Excel, the present invention is equally applicable to various other spreadsheet applications, web-based or online spreadsheets, such as Kyplot, Origin, Quantrix Modeler, Lotus Improv, Ability Spreadsheet, ExcelExplorer, GS-Calc, Mariner Calc, Softmaker Office Planmaker, Spread32, SygmaPlot, The Cruncher, Calc Open, KDCalc, ExcelLite, SpreadsheetGear, 602 Office Tab, Ability Office, Applixware Spreadsheets, AppleWorks, Ashampoo Office PlanMaker, Corel WordPerfect Office Quattro Pro, EasyOffice EasySpreadsheet, Evermore Integrated Office Spreadsheet, Framework, Gobe Spreadsheet, Lotus SmartSuiteLotus 123, Microsoft Works Spreadsheet, Softmaker Office PlanMaker, Open Office Calc, StarOffice Calc, Techdigm Office Calc, Thinkfree Office Spreadsheet, Xoom Office Spreadsheet, JotSpot Tracker, iRows.com, Numsum, ComplyXL, FlyCalc, i-spreadsheet, QuickBase, SecureSheet, Thinkfree, Online Spreadsheet and the like. Additionally, embodiments of the present invention are applicable to other types of productivity tools or programs designed to perform general computational tasks or organizational tasks in relation to underlying data, including word processing applications, such as Microsoft Word and the like and database applications or database management systems, such as 4D, Adabas, Corel Paradox, IBM DB2, FileMaker Pro, FirebirdSQL, IMS, Informix, Ingres, Microsoft Access, Microsoft SQL Server, MySQL, OOo Base, Oracle, PostgreSQL, SQLite, Sybase ASE and the like.

For the sake of illustration, various embodiments of the present invention are described herein in the context of computer programs, physical components, and logical interactions within modern computer networks. Importantly, while these embodiments describe various aspects of the invention in relation to modern computer networks and programs, the method and apparatus described herein are equally applicable to other systems, devices, and networks as one skilled in the art will appreciate. As such, the illustrated applications of the embodiments of the present invention are not meant to be limiting, but instead exemplary.

TERMINOLOGY

Brief definitions of terms, abbreviations, and phrases used throughout this application are given below.

The phrase "Analytical Access Point" or acronym "AAP" generally refers to a hub for a group of one or more users to access one or more AAUs (defined below). AAPs may cache data requested by users as well as provides "access management" for users accessing data from the AAUs within the environment. According to one embodiment, an AAP is a user-centric server component that can cache and/or aggregate user requested information before sending to the user. In one embodiment, an enterprise-level analysis and reporting system installation can support multiple AAPs and each AAP can request information from multiple AAUs. According to one embodiment, interactive queries in a Web-centric model are supported by a layered architecture including the chain from the user to the AAP to AAU(s).

The phrase "Analytical Aggregation Unit" or "Library" or acronym "AAU" generally refers to a collection of services that provide data and metadata storage and handle query resolutions. In one embodiment, an AAU is a data-centric server component that sends cubes and supporting information to a user-centric server component. In one embodiment, an enterprise-level analysis and reporting system installation can support multiple user-centric server components and each user-centric server component can request information from multiple AAUs.

The term "folio" generally refers to a collection of objects including one or more spreadsheets, metadata elements, hierarchies, and/or various other objects and properties that support enterprise reporting and analysis functionality. According to one embodiment, once a folio is created, reports and analysis can be published and distributed from the folio.

The terms "connected" or "coupled" and related terms are used in an operational sense and are not necessarily limited to a direct physical connection or coupling. Thus, for example, two devices may be couple directly, or via one or more intermediary media or devices. As another example, devices may be coupled in such a way that information can be passed there between, while not sharing any physical connection on with another. Based on the disclosure provided herein, one of ordinary skill in the art will appreciate a variety of ways in which connection or coupling exists in accordance with the aforementioned definition.

The phrases "in one embodiment," "according to one embodiment," and the like generally mean the particular feature, structure, or characteristic following the phrase is included in at least one embodiment of the present invention, and may be included in more than one embodiment of the present invention. Importantly, such phases do not necessarily refer to the same embodiment.

If the specification states a component or feature "may", "can", "could", or "might" be included or have a characteristic, that particular component or feature is not required to be included or have the characteristic.

The term "responsive" includes completely or partially responsive.

OVERVIEW

According to one embodiment, an enterprise-level analysis and reporting system is provided that allows non-technical (e.g., accounting or finance) users on a Personal Computer (or other Network Appliance) to drag and drop metadata elements (e.g., XBRL elements/objects or generic data keys) onto a productivity tool, such as a spreadsheet (e.g., Microsoft Excel), and interactively update the spreadsheet with aggregated information from originating transactions. According to one embodiment of the present invention, transactions are dynamically accumulated into time-sensitive balances (or buckets) and then aggregated into cube(s) before the spreadsheet is refreshed. The user can then drill back through aggregated information to original transaction information.

According to one embodiment of the present invention, a data/metadata/masterdata repository is provided based on data formatted using Extensible Business Reporting Language (XBRL) or other open XML-based standards. A user interface may also be provided to allow non-technical users to extract and present information from the data repository.

In one embodiment, a server-based data repository is provided which stores XBRL Instance Documents based on either XBRL-Financial Reporting (FR) and/or XBRL-General Ledger (GL) models, or any other open XML-based standard documents. This information can be input by various means, such as via traditional load-type methodologies or via Web Services-based data feeds. According to one embodiment, transactions are mildly aggregated (at near-transaction level detail) and are only aggregated into higher-level amounts when requested by a user query. The loading of data into the enterprise-level analysis and reporting system intelligently breaks down XBRL/XML documents into highly granular metadata components which can be accessed via the user interface.

According to one embodiment, a user interface is provided to the enterprise-level analysis and reporting system on client systems by way of a Designer based within a Microsoft (MS) Excel (or equivalent) worksheet environment that utilizes a selector panel to make lists of metadata available to the user. Depending upon the implementation, the user may be provided with the ability to create reports and analysis on the worksheet(s) by dragging and dropping metadata elements from the selector panel to the worksheet. The user interface may also contain additional features, such as those described below, that provide enterprise reporting and analysis functionality to enhance the user experience. In one embodiment, all of the design elements including worksheets, metadata and additional properties are packaged together in a folio.

Once data is loaded into the repository, it remains ready to serve user requests. According to one embodiment, when a user drops metadata elements onto a worksheet, and selects the "Refresh Data" function (from a toolbar or menu option, for example), mildly summarized data in the data repository may be transferred to balance buckets which correspond to the time period(s) specified by the user. According to one embodiment, these balance buckets are created in-memory on a server and are retained indefinitely for subsequent queries (based on use—buckets may be retired based on a demand algorithm). Active balance buckets may be automatically updated by new transactions loaded into the data repository. The "Refresh Data" requests (e.g., folio-level requests) by a user may create or update one or more cubes in memory as described further below.

FIG. 1 conceptually illustrates a network environment 100 in which embodiments of the present invention may be employed. In the present example, network environment 100 includes headquarters 10 and sales office 130 coupled in communication with West Coast AAU 130 and East Coast AAU 140 via a network, e.g., Internet 110. In alternative embodiments, the network could be a private network or other type of public network.

Headquarters 120 is shown including an HQ AAP 121 coupled to multiple clients 122a-n via a local area network (LAN) 125. Similarly sales office 130 is shown including a sales AAP 131 coupled to multiple clients 132a-n via a LAN 135. In one embodiment, software running on the clients 122a-n and 132a-n in combination with the AAPs 121 and 131 and the AAUs 140 and 150 represent an enterprise-level financial transaction system.

In one embodiment AAPs 121 and 131 represent hubs for a group of one or more users (not shown) of client systems 122a-n and 132a-n, respectively, to access AAUs 140 and 150. As describe in more detail below, AAPs 121 and 131 may cache data requested by users as well as provides access management for users accessing data from the AAUs 140 and 150 within the environment. According to one embodiment, the AAPs 121 and 131 are user-centric server components that can cache and/or aggregate user requested information before sending it to the user(s). In one embodiment, software running on the clients 122a-n and 132a-n includes a user interface embedded within a business document production application (e.g., a spreadsheet application).

In one embodiment, AAUs 140 and 150 represent a collection of services that provide data and metadata storage and handle query resolutions. In one embodiment, an AAU is a data-centric server component that sends cubes and supporting information to a user-centric server component (e.g., an AAP). In one embodiment, an enterprise-level analysis and reporting system installation can support multiple user-centric server components and each user-centric server component can request information from multiple AAUs.

Figure 2:
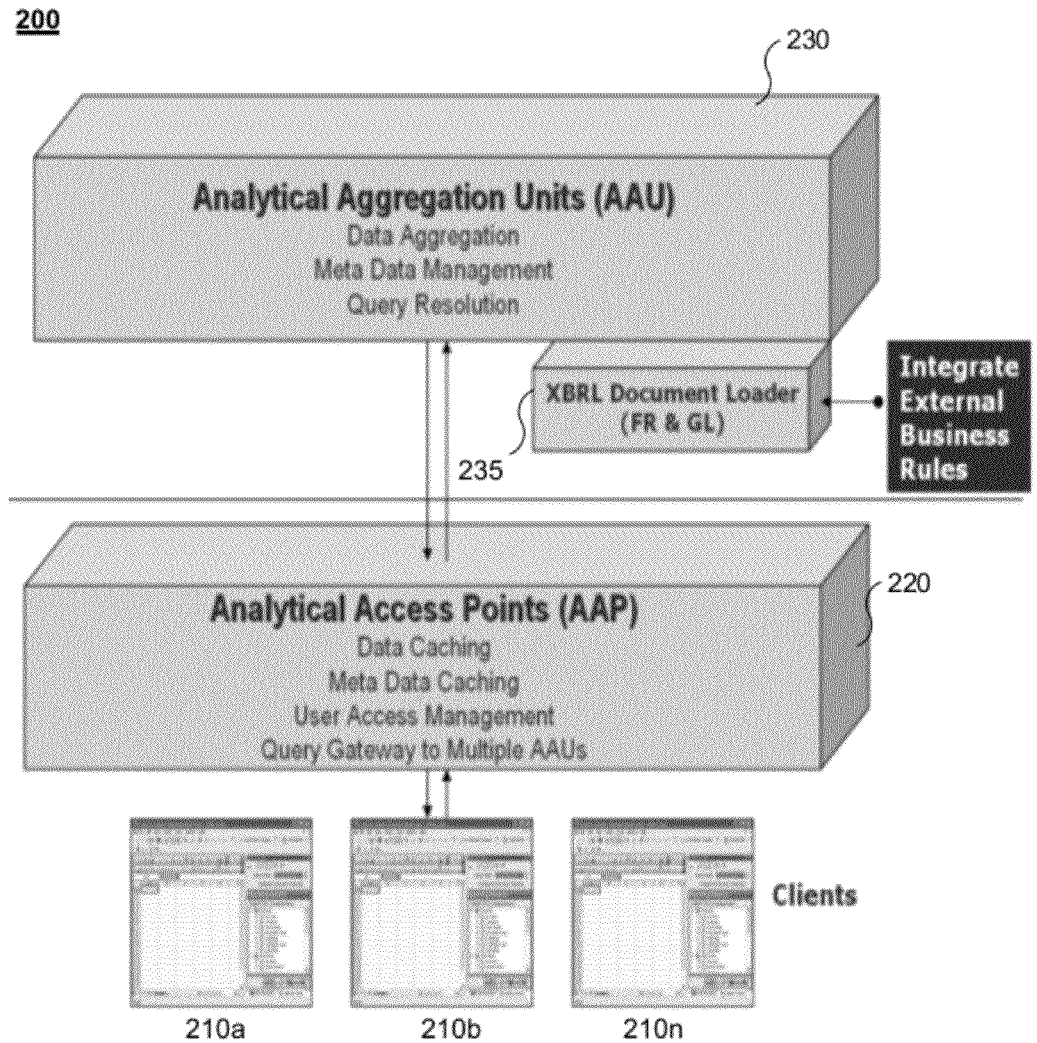
FIG. 2 illustrates at a high-level a layered framework that may be used to provide data and metadata storage and handle query resolutions for a reporting/analysis application in accordance with various embodiments of the present invention.

FIG. 2 illustrates at a high-level a layered framework 200 that may be used to provide data and metadata storage and handle query resolutions for a reporting/analysis application in accordance with various embodiments of the present invention. According to the architecture depicted in FIG. 2, AAP 220 is the hub for a group of one or more users (not shown) of clients 210a-n to access various AAUs (e.g., AAU 230).

According to one embodiment, and as described in further detail below, AAU 230 includes a collection of services that provide data and metadata storage and handle query resolutions. Depending on user requirements, AAU 230 can scale out and start multiple instances of each type of service.

According to one embodiment, an enterprise-level analysis and reporting system installation may have one or more AAUs (e.g., AAU 230) and one or more AAPs (e.g., AAP 220) depending on the location of users within the organization and the underlying complexity and/or location of the source data. In one embodiment, each AAP has a "host AAU" associated with it for (1) retrieving/publishing metadata sets; and (2) resolving queries (e.g., folio-level queries and drilldown queries).

In the present context, the main function of AAUs (e.g., AAU 230) is to store data and resolve queries. Consequently, AAUs are usually located close to where the source or originating data is located.

In the present context, the main function of AAPs (e.g., AAP 220) is to service the connected clients 210a-n and act as a (1) "request gateway" to the AAUs and (2) "results repository" for the clients 210a-n. In one embodiment, AAP 220 is implemented as a standalone service that can be loaded/started on a workgroup server or even on a high-powered workstation. AAPs, unlike the AAUs, are typically located as close as possible to the users.

According to one embodiment, when a query is resolved, AAP 220 caches the results for subsequent access by the requester or other users. When caching is employed or active, if a user requests information that is already contained in the cache (not shown) of AAP 220, AAP 220 assesses whether or not new data has been loaded/is available in AAU 230. If new data has been loaded since the data was cached within AAP 220, AAP 220 re-requests the data from AAU 230 to ensure that information on AAP 220 is "clean" before returning results to the users.

According to the one embodiment, each AAU can control multiple transaction managers (not shown), each of which can store data from different sources. In one embodiment, a transaction manager is a server component that stores and aggregates information from a single data source.

In one embodiment, clients 210a-n are not aware if the locally cached data within AAP 220 is clean. In such an embodiment, a request from a client is always sent to AAP 220 to determine this status. Alternatively, clients 210a-n may be made aware of the cache status and avoid sending requests to AAP 220 when the cached data is clean.

Figure 3:
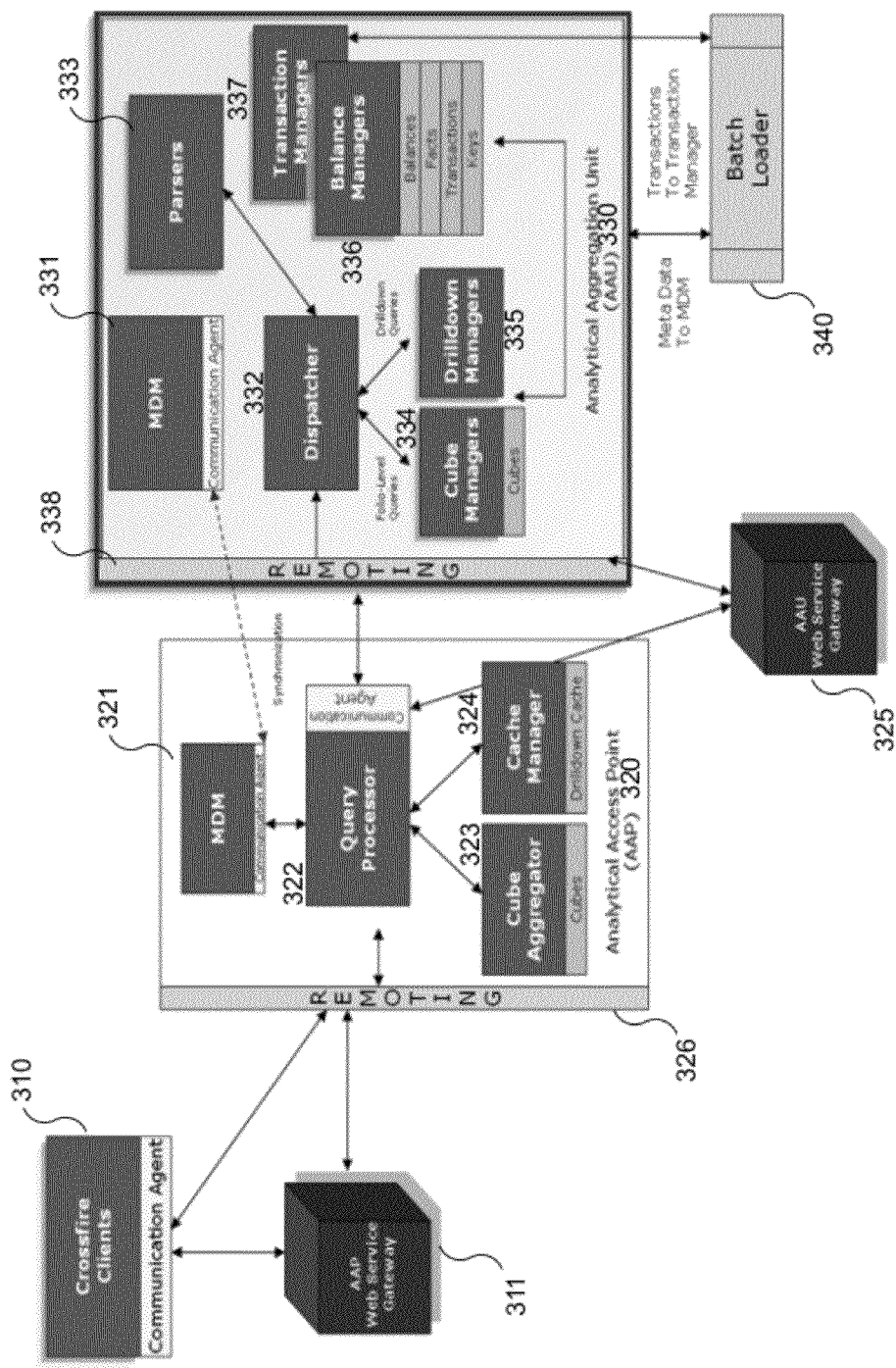
FIG. 3 illustrates exemplary functional units that may exist within the layered framework of FIG. 2 in accordance with various embodiments of the present invention.

FIG. 3 illustrates exemplary functional units that may exist within the layered framework of FIG. 2 in accordance with various embodiments of the present invention. In the present example, clients 310 interface with an AAP 320 via an AAP web service gateway 311 and/or via a remoting interface 326. Similarly, AAP 320 interfaces with an AAU 330 via an AAU web service gateway 325 or a remoting interface 338. According to one embodiment, each client 310 may cache drilldown data for a folio. Typically, only one folio and its associated data would be loaded in any client application instance. The clients may also maintain a mapping table (not shown) to map between folios/rows and the cached items.

AAP 320 is shown including a metadata manager (MDM) 321, a query processor 322, a cube aggregator 323 and a cache manager 324. MDM 321 is a centralized repository in which information regarding (1) services configuration; (2) key types and key values; and (3) design objects may be stored in accordance with one embodiment of the present invention. MDM 321 is the "database" that stores the metadata. For example, MDM 321 may a collection of all categories and locations of AAUs in the system. MDM 321 may also maintain a complete set of metadata from the host AAU (e.g., AAU 330).

In one embodiment, MDM 321 also maintains a "cube slice collection" (not shown) in memory for refresh folio-level memory. The cube slice collection may represent a list of information regarding cached cube slices. In one embodiment, cube slices may be identified by the following properties: an AAU ID, a folio ID, a folio name, a hierarchy node ID and a transaction batch ID (which may be used to compare with the AAU cube to see if the data is clean). According to one embodiment, MDM 321 uses an in-memory data store to store the metadata, but the metadata may be flushed to a database management system for offline storage and/or backup.

Query processor 322 represents a "gateway" component for AAP 320 to accept client requests. The requests include folio-level queries and drilldown queries.

Cube aggregator 323 "aggregates" folio-level query results returned from one or more AAUs. The results are passed to cube aggregator 332 from query processor 322.

Cache manager 324 caches requested drilldown data across multiple folios. According to one embodiment, cache drilldown data is maintained independently from folios to facilitate re-accessibility. Additionally, cache manager 324 may store cache data for each AAU separately. In one embodiment, cache manager 324 may maintain a mapping table (not shown) to map between folios/rows and the cached items. Cache manager 324 may implement a deletion algorithm for least-used cache items.

AAU 330 is shown including an MDM 331, a dispatcher 332, parsers 333, cube managers 334, drilldown managers 335, balance managers 336 and transaction managers 337. MDM 331 is a centralized repository in which information regarding (1) services configuration; (2) key types and key values; and (3) design objects may be stored in accordance with one embodiment of the present invention. MDM 331 is the "database" that stores the metadata. According to one embodiment, on startup, AAP 320 registers with its host AAU MDM (e.g., MDM 331). If the AAP MDM timestamp associated with the last key load does not match the current load timestamp for the AAU, then AAP 320 requests the appropriate metadata set from the host AAU MDM, including, for example, keys, calendar information for the host AAU, a list of active AAUs and the categories for each AAU. Similarly, if the AAP MDM timestamp associated with the last published objects does not match the current published object timestamp for the AAU, then AAP 320 request the appropriate published objects, e.g., hoppers, hierarchies, folios, etc. from the host AAU MDM.

According to one embodiment, the AAU MDM AAU has its own remotable. The AAP MDM may use the AAP query processor's remotable for processing the synchronization related information flow. The MDM gateway is designed to facilitate the synchronization of the metadata between AAPs and AAUs.

In one embodiment, AAUs "push" new timestamps to registered AAPs to inform them of the existence of new metadata and/or new published objects. For example, once the AAU MDM has new metadata loaded, it broadcasts to all registered AAPs the new current load timestamp. Similarly, when any user-created objects are created or modified (published), the AAU MDM may broadcast to all the registered AAPs the new current published object timestamp. In one embodiment, AAPs "pull" new metadata sets and published object sets from their host AAU. For example, AAPs may request the new metadata set and/or the new published objects from the host AAU when the AAP is idle and/or responsive to receiving a request from a client.

According to one embodiment, dispatcher 332 is the "hub" for communicating with AAU 330 to resolve queries. On startup, dispatcher 332 may register itself with MDM 331 and request a list of currently available parsers 333, cube managers 334 and drilldown managers 335 from MDM 331. This list may then be kept in memory by dispatcher 332. If a new cube manager, parser or drilldown manager comes online after dispatcher 332 has started, MDM 331 may make a call to dispatcher 332 to cause dispatcher 332 to update its local managers lists. To the extent, multiple parsers 333 exist within AAU 330, responsive to receipt of a query from AAP 320, dispatcher 332 uses the next available parser (in a round robin fashion, for example) to parse the query for execution.

According to the architecture of the present example, dispatcher 332 doesn't communicate directly with balance managers 336 or transaction managers 337. Folio-level queries go through the cube managers 334 and drilldown queries go through the drilldown managers 335. For example, when the query represents a folio-level query, the "parsed" query is then passed to the next available cube manager 334 for execution. And, when the query represents a drilldown query, the "parsed" query is sent to the appropriate drilldown manager 335 for execution.

To the extent the client queries differ in form from the server queries, the job of the parsers 333 is to translate any client queries into server queries that can be understood by the AAU servers. In one embodiment, each AAU can have one or more parsers. Parsers 333 register themselves with MDM 331 on startup. Parsers 333 parse the client queries to allow cube managers 334 or drilldown managers 335 to resolve the queries. Once translated, the "parsed" queries are returned by the parser to dispatcher 332, which in turn sends the parsed query to the appropriate server (e.g., cube manager or drilldown manager) for execution.

Cube managers 334 manage the in-memory data stores that store cubes. According to one embodiment, each cube corresponds to a folio. A cube may have 1-N slices. Each slice is for a unit in the reporting hierarchy. If no hierarchy is used in the folio, then a virtual "summary" unit may be assumed and created. In one embodiment, the cubes are stored in memory (only the most frequently accessed) and are flushed to binary files for backup and/or offline storage.

Since most cubes are expected not to be 100% dense (dense means has non-zero value in each cell), a pointer array and two value arrays (one for raw data, and one for presentation data) may be created for each slice to conserve memory.

Drilldown managers 335 are responsible for consolidating drilldown results returned from one or more balance managers 336. Drilldown managers also handling any "paging" of the drilldown results. According to one embodiment, drilldown managers are simply pass-throughs and therefore do not cache any data. The actual drilldown data may be cached in the balance managers 336.

According to one embodiment, balance managers 336 store "aggregated" facts in memory based on user queries. This speeds up the reporting process when a query is used more than once, as the information is already available in memory. In one embodiment, the following steps are used by the balance managers 336 to optimize the amount of balances that can be stored. First, balances are aggregated based on a time bucket defined in the query and not based on the lowest time bucket that was used to aggregate the facts. Second, a pre-configured cache size limit is defined for the balances. Once the cache size is reached, least-accessed balances are discarded based on the timestamp of when the balance was last used. In one embodiment, a balance has four distinct components: (i) a balance pointer (BP), which is the key to identify a balance record; (ii) a dimension pointer (DP) list, which is a list that makes up a BP; (iii) a balance time bucket, which defines the level at which the balance is aggregated and the time frame for which the balance is aggregated; and (iv) an array of balances, which defines the actual data that makes up the balance.

In one embodiment and as described further below, user/customer queries define the key to a balance record. The balance managers 336 then compare the BP(s) represented within newly received queries with the balance keys associated with cached balances to determine if an existing balance can be used to calculate the amount for the query at issue. The DP list is used to update the balance if new data is received into the repository for any of the DPs defined in the DP list. The query time bucket is defined by the user query. Exemplary time buckets include yearly, quarterly and monthly time buckets. According to one embodiment, the fiscal year is stored as an offset from the year 1900. For example, 2003 is stored as 103. In one embodiment, balances are aggregated by system key (e.g., scenarios, posting status, balance type, adjustment status, currency code, originating currency code) and when new transactions are loaded into the transaction managers 337, the balances are refreshed to keep the balances "clean".

Transaction managers 337 each are configured to store transaction data for a particular category (e.g., a type of data, such as financial, sales, CRM, HR, etc.). In one embodiment, transaction managers 337 are initialized with a category and a time bucket. Transaction managers 337 may support multiple methods of storing balances, including, but not limited to (i) in-memory balances, in which balances are stored in the memory space in the transaction manager; (ii) in-AWE balances, in which balances are stored in windows extended memory and the action process memory is not used to store the actual balances; (iii) remote in-memory balances, in which balances are stored in the memory space of a separate process called the balance manager; and (iv) remote in-AWE balances, in which balances are stored in windows extended memory of a separate balance manager process. Loading of data into the transaction managers 337 via a batch loader 340 is described below.

In one embodiment, the enterprise-level analysis and reporting system implements communication agents that control the communication between the different layers (e.g., client ⇐⇒AAP and AAP ⇐⇒AAU). In the context of the present example, there are two communication channels supported: Remoting and Web Services. The communication agents can be configured to use either communication channel selected and implemented by the customers. Each AAP can support both communication channels. The appropriate communication method for each client can be configured based on the user's network setup.

Figure 4:
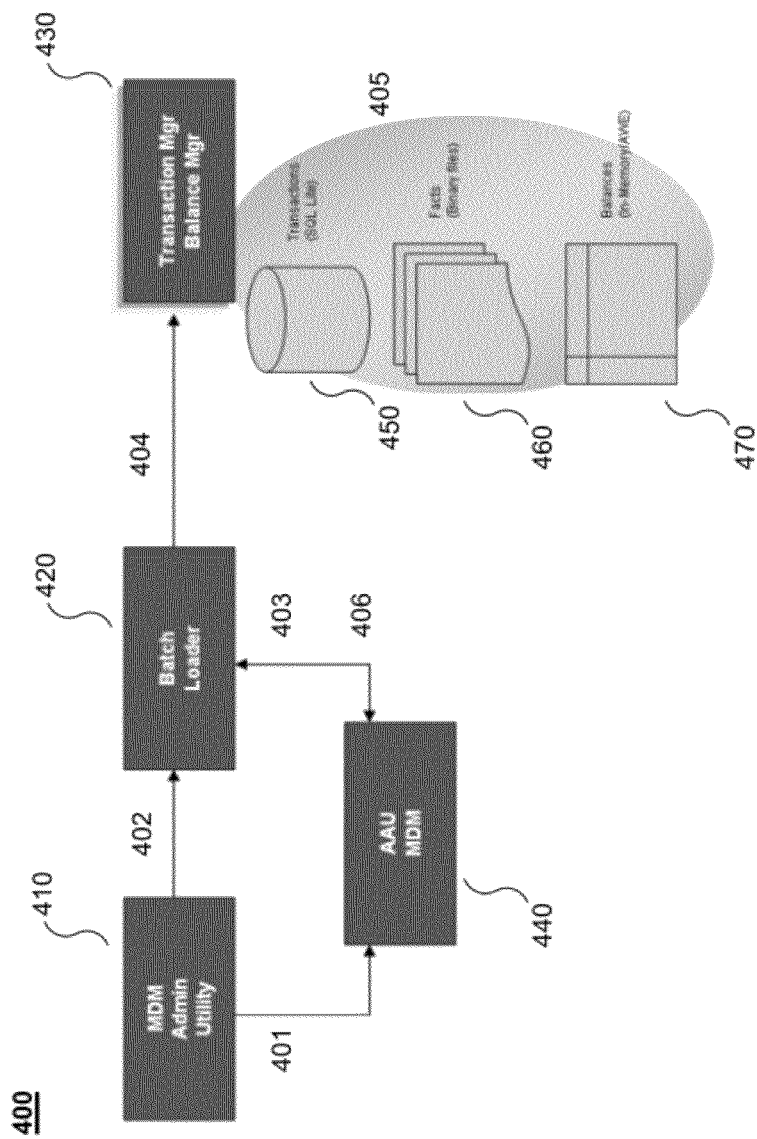
FIG. 4 is a block diagram illustrating batch load processing in accordance with various embodiments of the present invention.

FIG. 4 is a block diagram illustrating batch load processing 400 in accordance with various embodiments of the present invention. According to one embodiment, a MDM admin utility 410 interacts with both an AAU MDM 440 and a batch loader 420 to configure 401 the AAU MDM 440 and initiate batch loading 402. Batch loader 420 sends batches of transactions 404 to a transaction manager/balance manager 430.

In one embodiment, the batch load process 400 loads and converts the XBRL-GL and XBRL-FR based instance documents into appropriate transaction objects and keys. New keys are sent 403 to AAU MDM 440, and the transactions are sent 404 to the transaction manager(s)/balance manager(s) 430 for processing.

At 403 batch loader 420 obtains existing keys from AAU MDM 440 and sends new keys to AAU MDM 440. At this time, folios, hoppers and/or hierarchies that are affected by the transaction at issue may be updated.

At 405, new keys are added, transactions are added, facts are added and updated and balances dependent upon updated facts are updated to keep the balances clean.

According to one embodiment, each "batch" of transactions 404 is divided into "loads" for processing. For example, the default max batch size may be 100,000 transactions, and the default max load size may be 10,000 transactions.

In one embodiment, data load process in the transaction manager is optimized to reduce the load time. For example, transactions may be grouped by the account key value (transactions may be sorted by account key value by batch loader 420 during the conversion process) and placed on individual threads for resolving the DP. Each transaction either belongs to an existing DP, or a new DP is created. In one embodiment, approximately, 1,000 transactions are placed on a single thread. Facts are created or updated based on the new data. If the data load impacts any of the balances 470, the balances 470 are be refreshed. Facts may be flushed to the binary files 460. Transactions can be flushed to a database management system 450.

Figure 5:
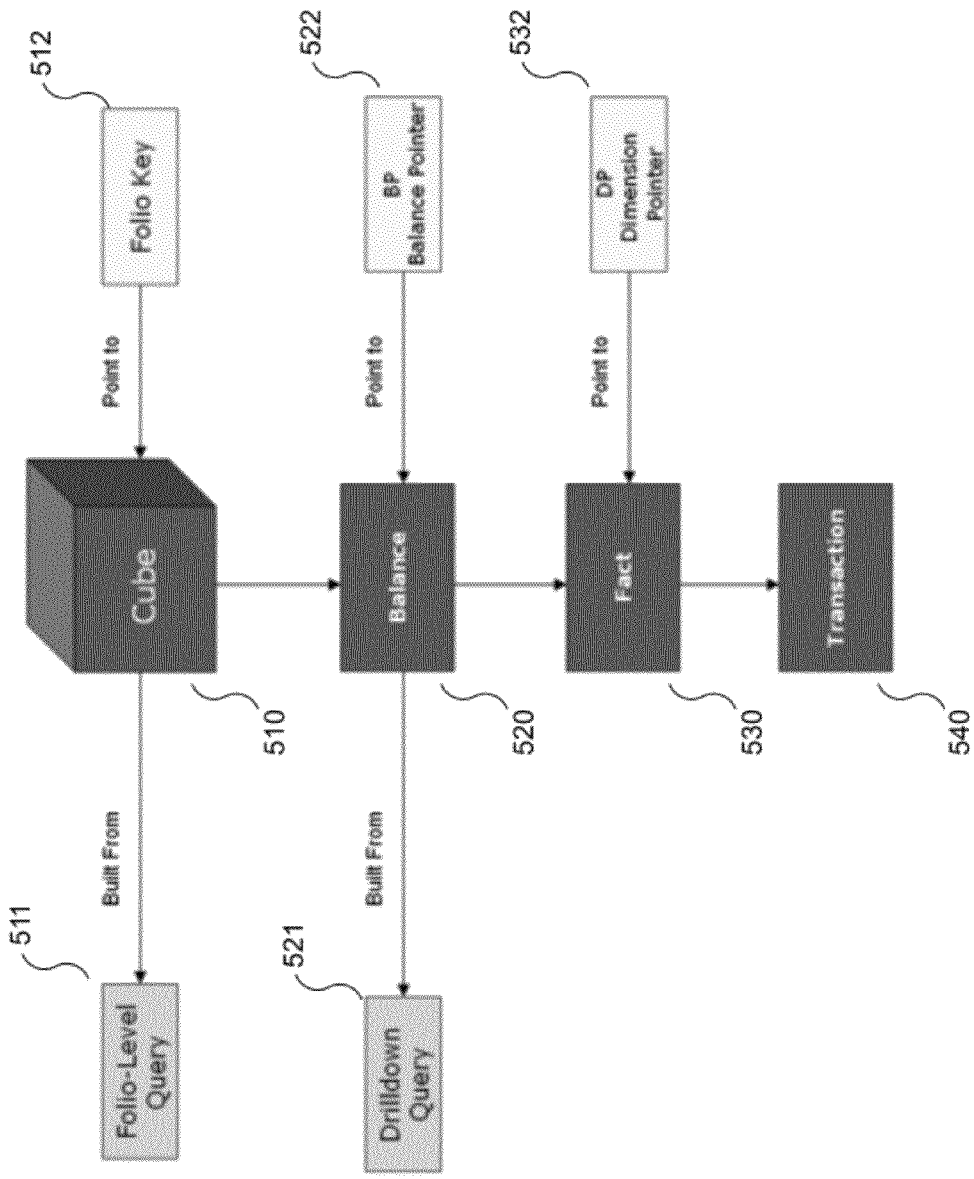
FIG. 5 illustrates exemplary data structures for storing data in accordance with various embodiments of the present invention.

FIG. 5 illustrates exemplary data structures for storing data in accordance with various embodiments of the present invention. According to one embodiment, four main data structures that store "data" are cubes 510, balances 520, facts 530 and transactions 540.

Cubes 510 are built based on folio-level queries 511, which specify one or more folio keys 512. When a folio-level request is received, the query is sent to the balance manager(s) from cube manager. Balance managers create new balances 520 if the requested "DP List" 532 (which map to a BP 522) has not been encountered before. Once the results are returned from the balance managers, cube manager consolidates the results (consolidate into one amount per cell address) and builds a cube slice.

Each folio can have one or more cubes 510 associated with it. If multiple design sheets were created and used by different hierarchy nodes in the folio-level hierarchy, then each design sheet (which has a unique "shape") would have a cube created.

Balances 520 can also be built based on drilldown queries. Similar to the folio-level processing, when a new BP is encountered, then new balances are created in the system. If the BP already existed in the system, but new time bucket/fiscal dates were requested, the balances would also be created.

Figure 6:
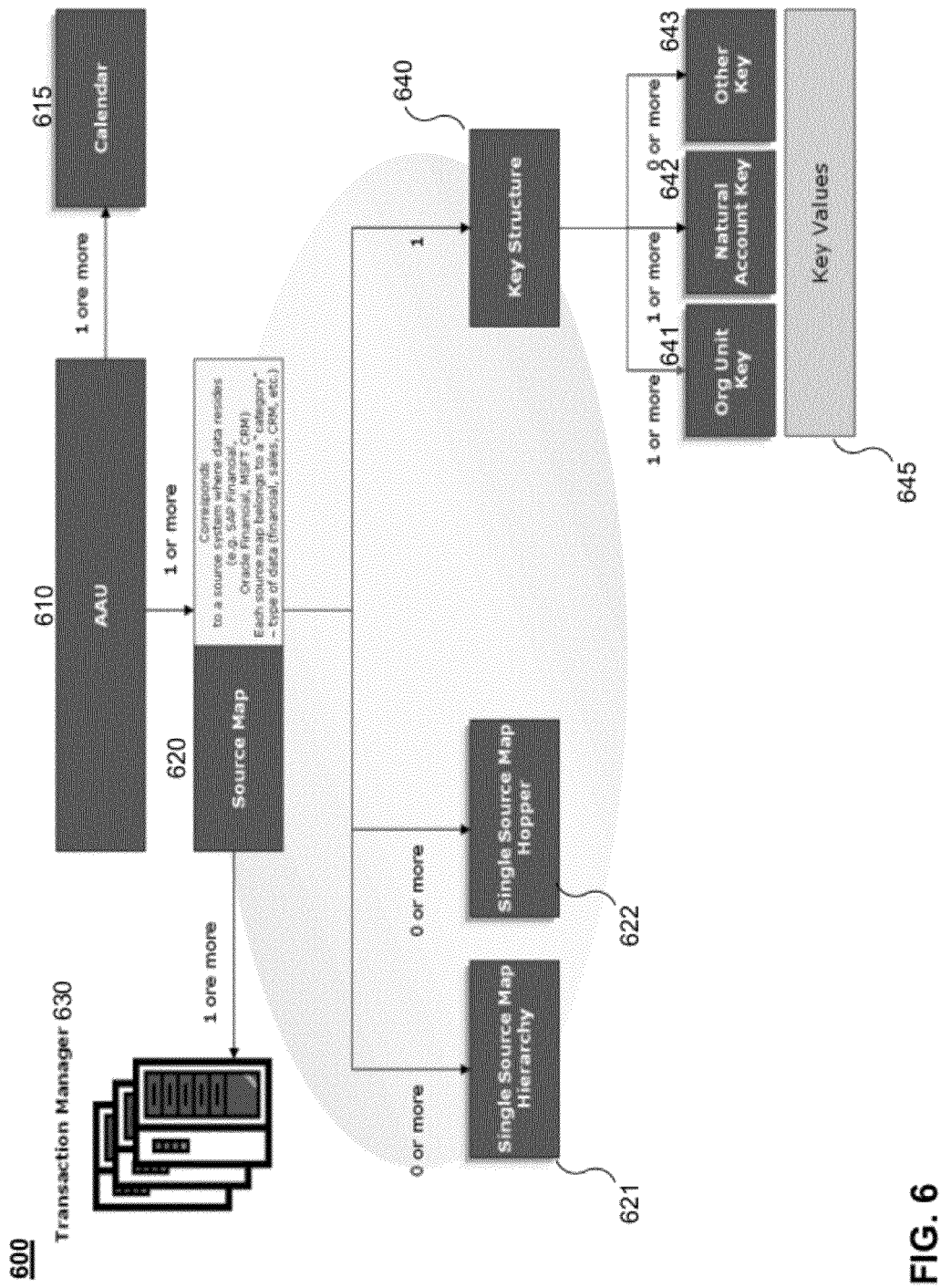
FIG. 6 is a system object map in accordance with an embodiment of the present invention.

FIG. 6 is a system object map 600 in accordance with an embodiment of the present invention. In the present example, an AAU 610 is associated with one or more source maps 620 and therefore can contain data and metadata from 1 or more source systems (e.g., SAP financial, Oracle financial, Microsoft CRM, etc.) where the data resides. In one embodiment, in order to facilitate scalability, customers can configure and have multiple transaction/balance managers that store data for a single source system. However, typically each transaction manager/balance Manager is configured to store data for a single source system.

Collectively, the data and metadata for a single source system is referred to as a source system map. The source system map enables users to navigate the data stored within a source system.

A source system map corresponds to a single data source. If a corporation has multiple financial systems, each financial system would typically be mapped to a separate source system map. Even though these source systems all store "financial" data, because of the different key structure 640 in each system, separate source system maps may be used. In order to produce consolidation reports that span across multiple source systems, users typically either: (i) create hoppers 662 for each source system and selected multiple hoppers for each cell, or (ii) create hopper that have multiple dependent hoppers—one dependent hopper for each source system.

Similar design issues apply to hierarchies. Each hierarchy node 621 contains one or more client query keys—source map ID+key type+key value(s).

In this manner, each source system belongs to a "category"—type of data. The categories include, for example, financial, sales, CRM, HR and others. The category enables the system to provide business intelligence for the known system types (for example, financial data would have the concept of debits, credits, etc.) A transaction-level source would have its own COA structure. A FR-level source would be mapped to a base taxonomy, and each entity in this source can have its own extension taxonomies.

Figure 7:
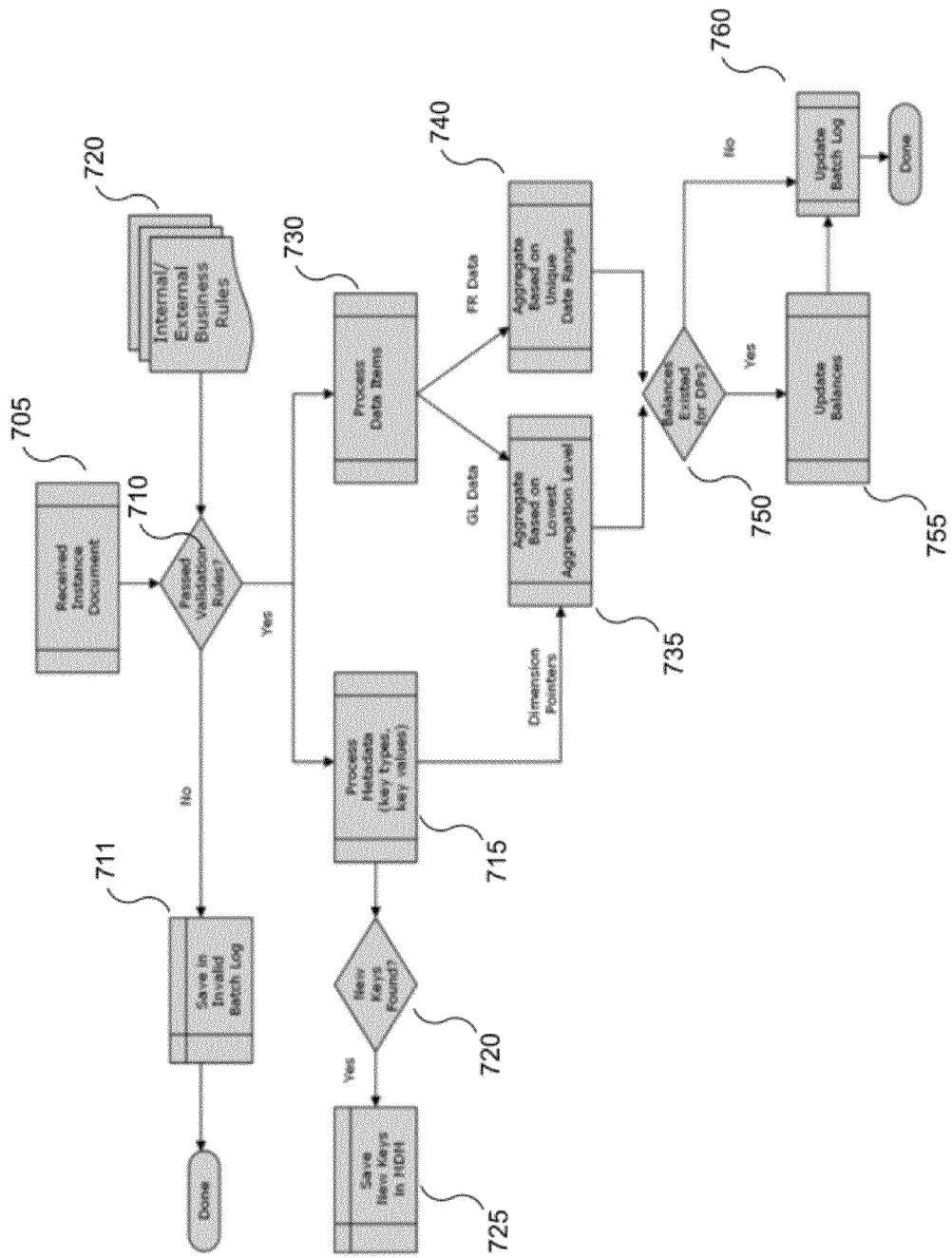
FIG. 7 is a flow diagram illustrating data load processing in accordance with an embodiment of the present invention.

FIG. 7 is a flow diagram illustrating data load processing in accordance with an embodiment of the present invention. According to the present example, raw standard-based XML data documents (e.g., received instance document 705) are disseminated into two categories of objects: (i) metadata—key types, key values; and (ii) data items (numeric or non-numeric data items). The raw data items and metadata are loaded into the data repository. The enterprise-level analysis and reporting system understands how to decompose the highly complex instance documents (e.g., received instance document 705), and is able to create general, lightweight business objects (calendar, currency code and other numeric units, like shares, earning per share and accounts) for the end users to use.

According to the present example, the enterprise-level analysis and reporting system has the ability to integrate with external business rules 720 for processing the instance documents (e.g., received instance document 705). Rules can be feed into the system (e.g., in XML format) and any transactions that do not pass the rules can be logged in an exception log.

At decision block 710, internal/external business rules 720 are applied to a received instance document 705 to determine if it passes the validation rules. If so, then processing continues with blocks 715 and 730; otherwise, the transactions associated with the received instance document 705 are stored in an invalid batch log at block 711 and processing of the received instance document 705 is complete.

At block 715, metadata (e.g., key types and key values) associated with the received instance document 705 is processed. If new keys are found at decision block 720 they are saved in MDM at block 725.

At block 730, data items (e.g., numeric and non-numeric data) associated with the received instance document 705 are processed. GL data is aggregated based on a lowest aggregation level at block 735 and FR data is aggregated based on unique date ranges at block 740.

At decision block 750, a determination is made with respect to whether balances are currently cached for DPs represented by the newly loaded data. If so, then at block 755 the affected balances are updated and processing completes after the batch log is updated at block 760. The batch can then be submitted to the transaction manager to be stored as described further below.

Figure 8:
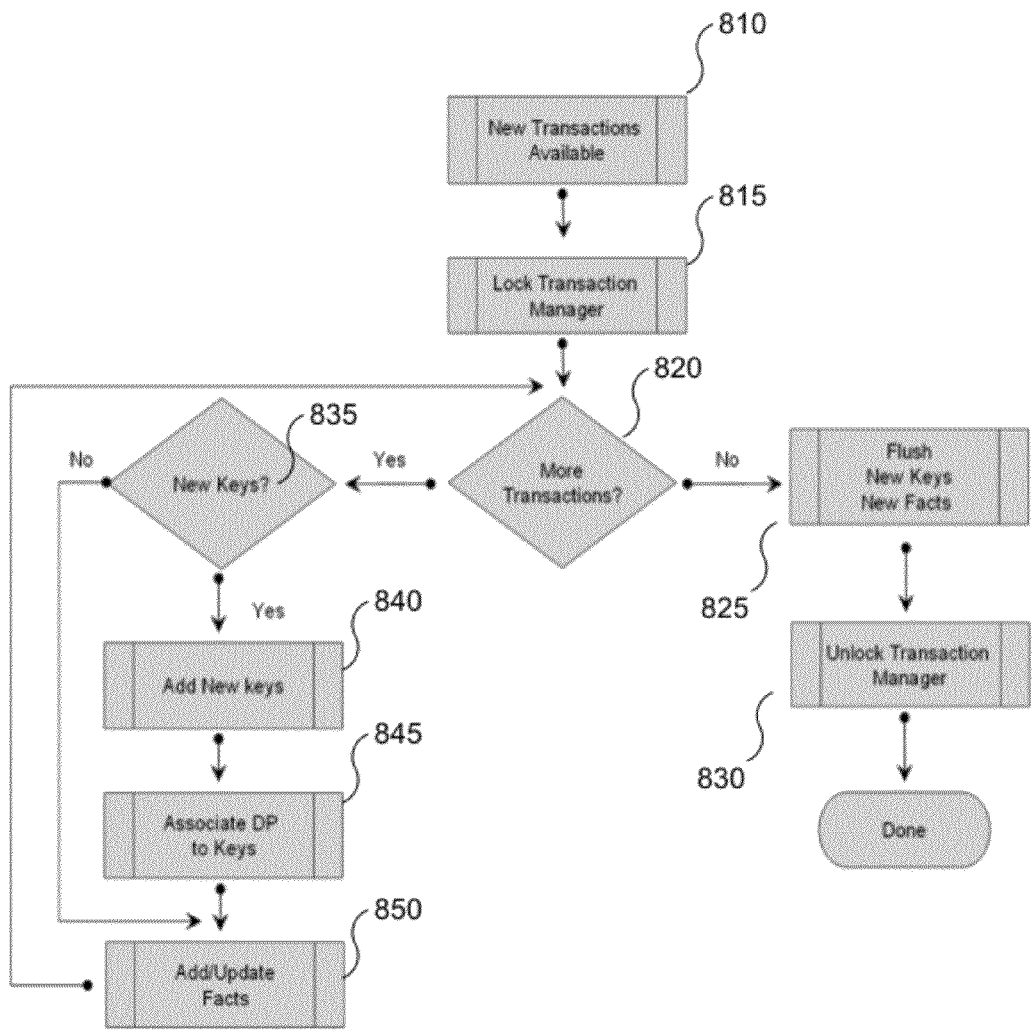
FIG. 8 is a flow diagram illustrating transaction manager load processing in accordance with an embodiment of the present invention.

FIG. 8 is a flow diagram illustrating transaction manager load processing in accordance with an embodiment of the present invention. In one embodiment, data is loaded into the transaction manager in batches. When a new load is started the transaction manager is made unavailable for other interactions until the load in completed.

According to the present example, processing of new batches of transactions by the transaction manager begins at block 810. At block 810, new transactions are received by the transaction manager. At block 815, the transaction manager is locked. For example, in one embodiment, the status of the transaction manager is changed to "Load in Progress" in the MDM.

While more transactions are available as determined at decision block 820, new keys are added, DPs are associated with the new keys and facts are updated and/or added. At decision block 835, it is determined if new keys are to be created. If so, at block 840, the new keys are added and a new or existing DP is associated to the new keys at block 845. If no new keys are to be created, then processing branches to block 850 where facts are added/updated based on the new transactions.

When no more transactions are present (e.g., the end of a load), the processing continues with block 825 in which new facts and new keys are stored. In one embodiment, this includes flushing the facts to a binary file (potentially including merging facts with existing facts) and flushing transactions to a database (e.g., an SQLLite database).

At block 830, the transaction manager is made available for other interactions by updating the status of the transaction manager in the MDM to "Available" or "Idle," for example.

Figure 9:
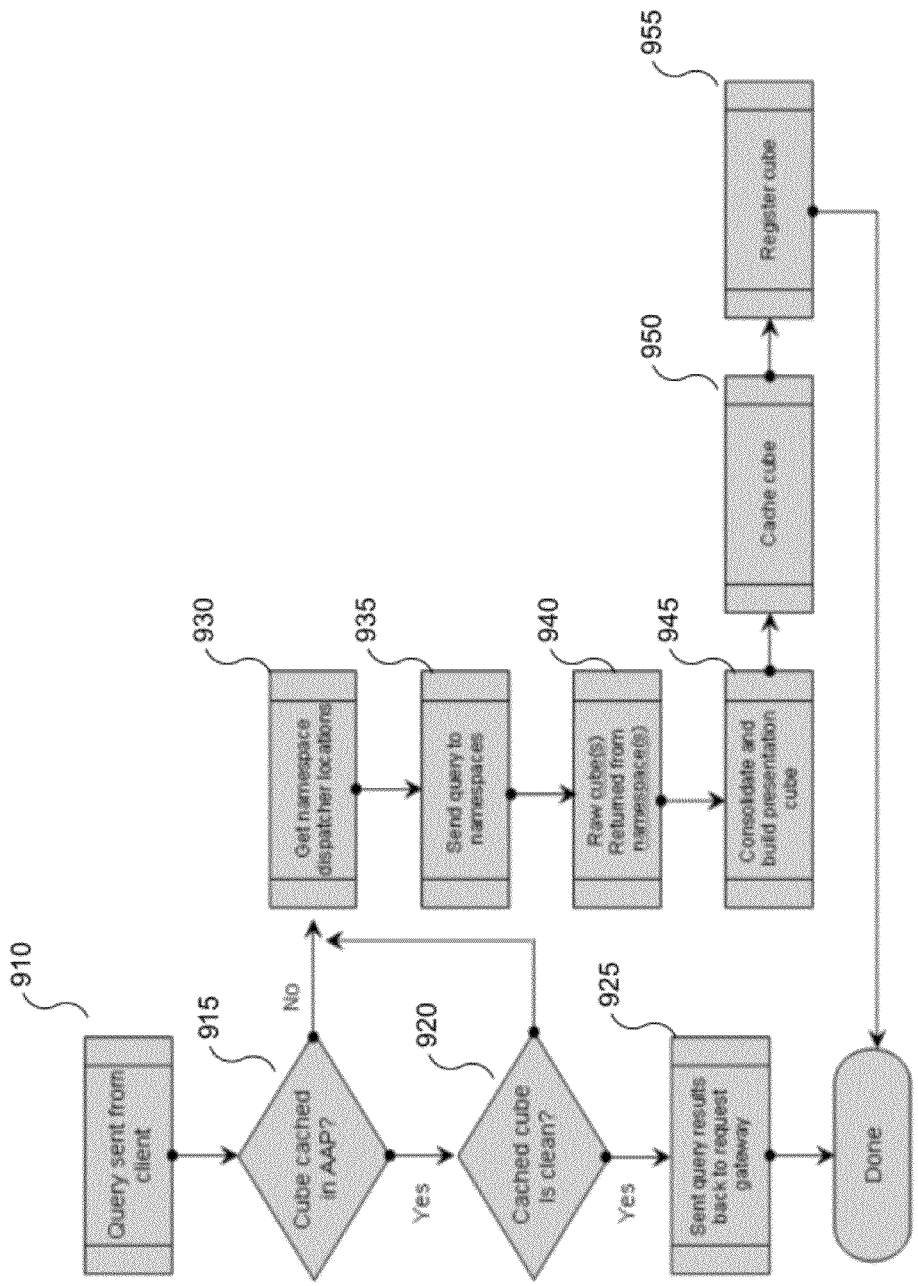
FIG. 9 is a flow diagram illustrating folio-level query processing performed by an AAP in accordance with an embodiment of the present invention.

FIG. 9 is a flow diagram illustrating folio-level query processing performed by an AAP in accordance with an embodiment of the present invention. In some embodiments, the caching architecture includes both real-time updating of balances within the AAU as well as caching of cubes in the AAP.

At block 910, the AAP receives a folio-level query from a client. At decision block 915, a determination is made whether the corresponding cube is cached in the AAP. If so, then processing continues with decision block 920 to determine if the cached cube is clean. If so, then processing continues with block 925 in which the query results are returned to the client without having to forward the query to the AAU.

If, however, either the cube is not cached in the AAP or the cached cube is not clean, then processing branches to block 930 where the query is sent to a dispatcher (e.g., dispatcher 332) of the host AAU. At block 940, the raw cube(s) is returned from the dispatcher. The cube is consolidated and an appropriate presentation cube is built (block 945), cached (block 950) and registered with the MDM (block 955).

Figure 10:
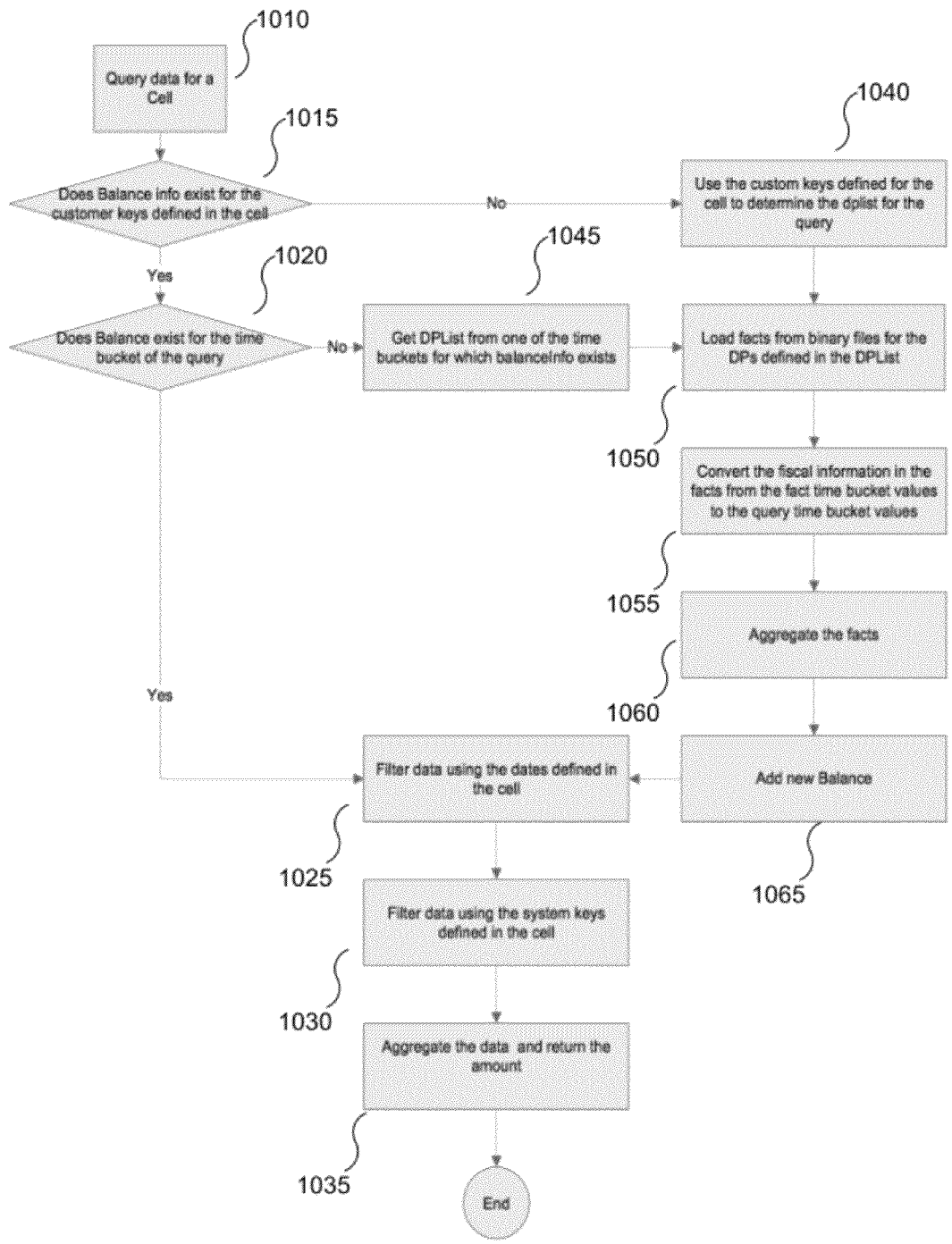
FIG. 10 is a flow diagram illustrating folio-level query processing performed by an AAU in accordance with an embodiment of the present invention.

FIG. 10 is a flow diagram illustrating folio-level query processing performed by an AAU in accordance with an embodiment of the present invention. At block 1010 a query for data for a cell is received by the transaction manager. At decision block 1015, the transaction manager determines whether balance information exists for the customer keys defined in the cell. If so, then processing continues with decision block 1020 in which it is determined whether the balance exists for the time bucket of the query. If so, then processing continues with block 1025.

At block 1025, the data is filtered using the dates defined in the cell.

At block 1030, the data is filtered using the system keys defined in the cell.

At block 1035, the data is aggregated and the amount is returned and processing is complete.

Returning to decision block 1015, if the balance information does not exist, then processing branches to block 1040 in which the customer keys defined for the cell are used to determine the DP list for the query.

Returning to decision block 1020, if the balance does not exist for the time bucket of the query, then processing branches to block 1045 in which the DP list is retrieved from one of the time buckets for which balance information does exist.

At block 1050, facts are loaded from the binary files for the DPs defined in the DP list determined in block 1045 or block 1040.

At block 1055 the fiscal information in the facts are converted from the fact time bucket values to the query time bucket values.

The facts are then aggregated in block 1060.

At block 1065 a new balance is created and cached to facilitate faster processing of subsequent queries.

Figure 11:
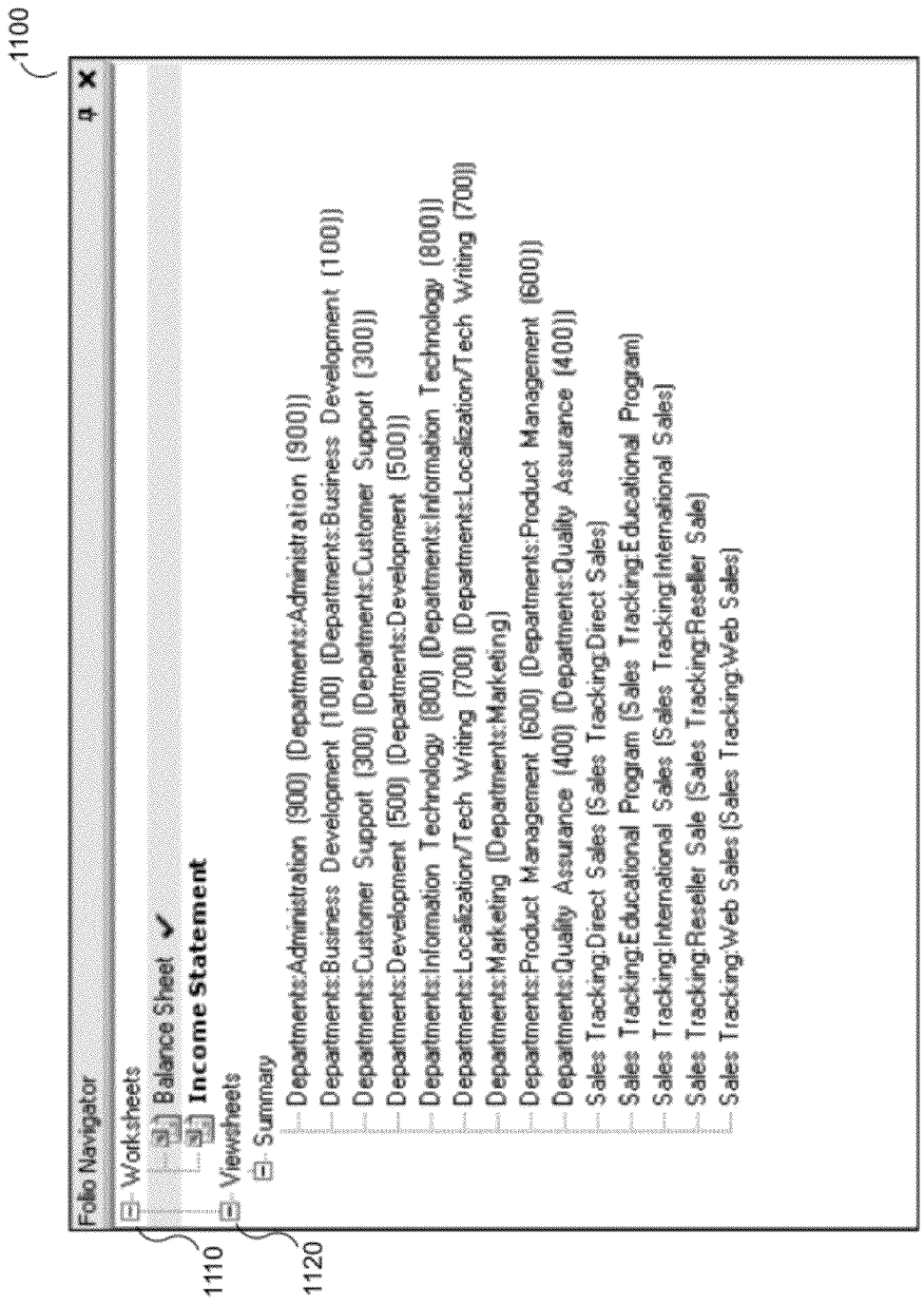
FIG. 11 is a folio navigator panel in accordance with an embodiment of the present invention.
Figure 12:
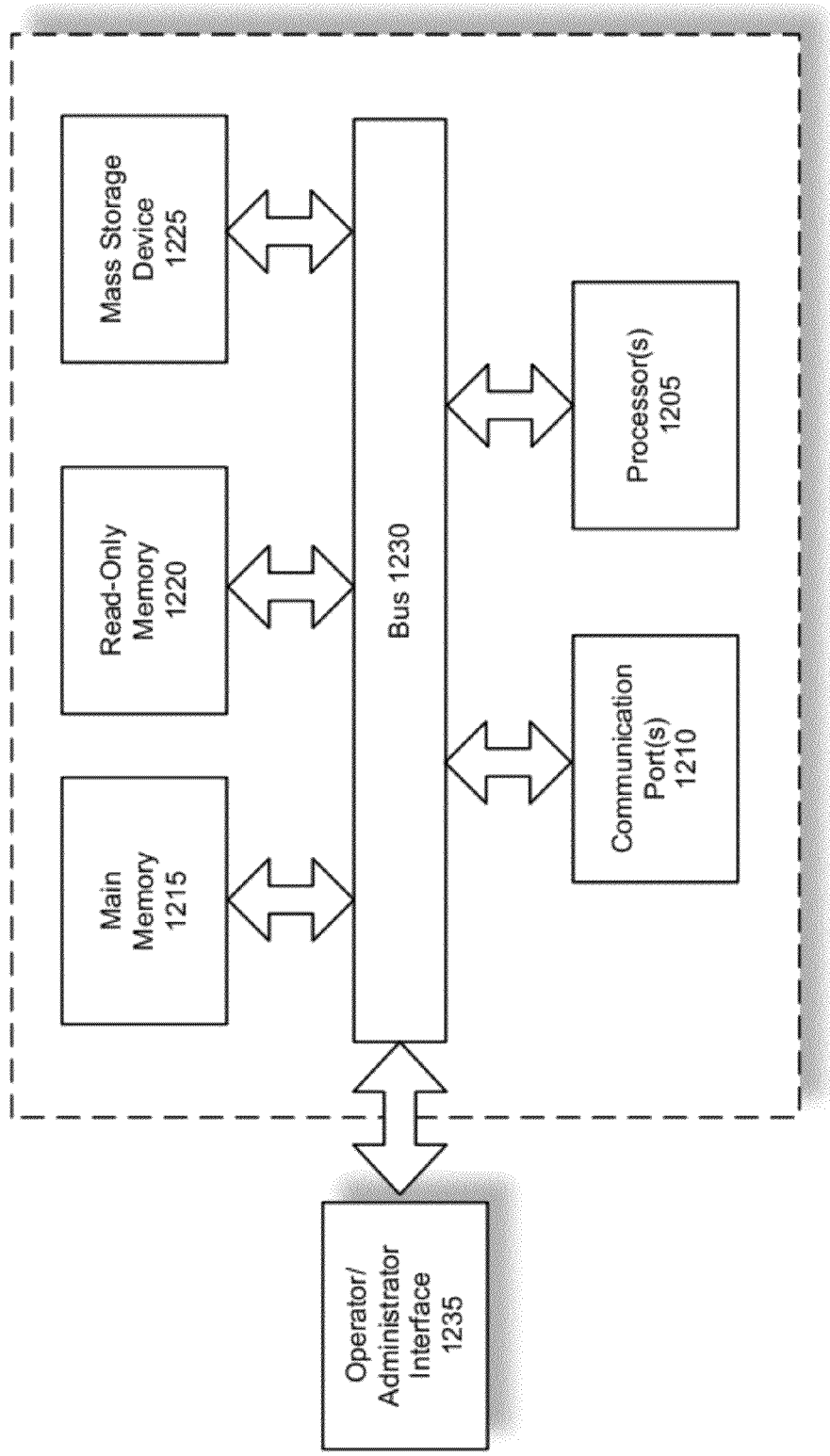
FIG. 12 is an example of a computer system with which embodiments of the present invention may be used.

FIG. 11 is a folio navigator panel 1100 in accordance with an embodiment of the present invention. In one embodiment folio navigator panel 1100 displays design sheets 1110 and view sheets 1120 included in the current folio. The user can navigate and trigger data refresh by clicking on different nodes in the tree.

Exemplary Computer System Overview

Embodiments of the present invention include various steps, which will be described in more detail below. A variety of these steps may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware. As such, FIG. 1 is an example of a computer system 100, such as a workstation, personal computer, client, server, or gateway, upon which or with which embodiments of the present invention may be utilized.

According to the present example, the computer system includes a bus 130, at least one processor 105, at least one communication port 110, a main memory 115, a removable storage media 140 a read only memory 120, and a mass storage 125.

Processor(s) 105 can be any known processor, such as, but not limited to, an Intel® Itanium® or Itanium 2 processor(s), or AMD® Opteron® or Athlon MP® processor(s), or Motorola® lines of processors. Communication port(s) 110 can be any of an RS-232 port for use with a modem based dialup connection, a 10/100 Ethernet port, or a Gigabit port using copper or fiber. Communication port(s) 110 may be chosen depending on a network such a Local Area Network (LAN), Wide Area Network (WAN), or any network to which the computer system 100 connects.

Main memory 115 can be Random Access Memory (RAM), or any other dynamic storage device(s) commonly known in the art. Read only memory 120 can be any static storage device(s) such as Programmable Read Only Memory (PROM) chips for storing static information such as instructions for processor 105.

Mass storage 125 can be used to store information and instructions. For example, hard disks such as the Adaptec® family of SCSI drives, an optical disc, an array of disks such as RAID, such as the Adaptec family of RAID drives, or any other mass storage devices may be used.

Bus 130 communicatively couples processor(s) 105 with the other memory, storage and communication blocks. Bus 130 can be a PCI/PCI-X or SCSI based system bus depending on the storage devices used.

Optionally, operator and administrative interfaces (not shown), such as a display, keyboard, and a cursor control device, may also be coupled to bus 130 to support direct operator interaction with computer system 100. Other operator and administrative interfaces can be provided through network connections connected through communication ports 110.

Removable storage media 140 can be any kind of external hard-drives, floppy drives, IOMEGA® Zip Drives, Compact Disc—Read Only Memory (CD-ROM), Compact Disc—Re-Writable (CD-RW), Digital Video Disk—Read Only Memory (DVD-ROM).

The components described above are meant to exemplify some types of possibilities. In no way should the aforementioned examples limit the scope of the invention, as they are only exemplary embodiments.

EXAMPLES

Example #1

Query Processing and Balance Creation

The following illustrates an example of how an enterprise-level analysis and reporting system processes one request and creates the balances according to one embodiment of the present invention.

The current example assumes the following DPs are currently defined in the system:

| DP | Entity | Loc | Department | Product | Manager | Account |
|----|--------|-----|------------|---------|---------|---------|
| 1 | 1 | Den | Mkt | Widget1 | 100 | 1100 |
| 2 | 1 | Den | | | 200 | 4100 |
| 3 | 1 | Den | | Widget1 | | 4100 |
| 4 | 1 | | | Widget1 | | 6500 |

A key table may be created as follows:

| Key Type | Key Code | DP Array |
|----------|----------|----------|
| Entity | 1 | {1, 2, 3, 4} |
| Loc | Den | {1, 2, 3} |
| Department | Mkt | {1} |
| Product | Widget1 | {1, 3, 4} |
| Manager | 100 | {1} |
| Manager | 200 | {2} |
| Account | 1100 | {1} |
| Account | 4100 | {2, 3} |
| Account | 6500 | {4} |

If the system received a query for [Entity-1], [Loc.Den], [Account.4100], [Actual, USD, Jan. 1, 2003-Jan. 31, 2003), the following process may be executed to create the balances:

(1) The system resolves the DPs that are shared by the keys in the query
[Entity.1]→{1,2,3,4}
[Loc.Den]→{1,2,3}
[Account.4100]→{2,3}
resolved DPs={2,3}

(2) The system uses the resolved DPs to get facts from the fact table and aggregates the amount from the facts (the facts are filtered by periods, book code and currency code—if applicable)

(3) Create balances in a balance table

| Balance Key | Year | Period | Book Code | DR/CR/ Net | Adjustment | Amount |
|-------------|------|--------|-----------|------------|------------|--------|
| [Entity.1], [Loc.Den], [Account.4100] | 2003 | 1 | Actual | Net | Normal | 100.00 |

In order to conserve memory usage, a more compact data structure would typically be used to represent the key combination.

Example #2

Data Loading

The following illustrates an example of how an enterprise-level analysis and reporting system loads data into a transaction manager according to one embodiment of the present invention.

According to the present example, the customer has the following three customer key segments:

| Key Segment Name | Key Segment Id | Key Value Ids |
|------------------|----------------|---------------|
| Company | 1 | 1, 2 |
| Sales Person | 2 | 1, 2, 3, 4, 5, 6 |
| Product Id | 3 | 1, 2, 3, 4, 5, 6, 7, 8, 9, 10 |

According to the present example, the customer has the following values for the system key segments:

| Key Segment Name | Key code | Key value Ids |
|------------------|----------|---------------|
| Scenario | Scenario1 | 1 |
| | Scenario2 | 2 |
| Balance Type | Credit | 1 |
| | Debit | 2 |

-continued

| Key Segment Name | Key code | Key value Ids |
|---|---|---|
| Posting status | Posted | 1 |
| Currency Code | USD | 1 |
|  | Canadian Dollar | 2 |
|  | Euro | 3 |
| Originating Currency | USD | 1 |
|  | Canadian Dollar | 2 |
|  | Euro | 3 |
| Adjustment status | None | 1 |
|  | Month end adjustment | 2 |
|  | Year end adjustment | 3 |

According to the present example, the Id numbers in the above tables represent the internal identification for the actual key segment names and key codes. The transaction manager may use these internal representations to save storage space.

According to the present example, the calendar used by the transaction manager is defined as follows and it has Yearly, Quarterly and Monthly time buckets. The fiscal year is stored as an offset from the year 1900. Therefore, 2003 is stored as 103.

Time Bucket Yearly

| From date | To date | Fiscal Year | Fiscal Period |
|---|---|---|---|
| Time Bucket yearly | | | |
| Jan. 1, 2003 | Dec. 31, 2003 | 103 | 1 |
| Time Bucket Quarterly | | | |
| Jan. 1, 2003 | Mar. 31, 2003 | 103 | 1 |
| Apr. 1, 2003 | Jun. 30, 2003 | 103 | 2 |
| Jul. 1, 2003 | Sep. 30, 2003 | 103 | 3 |
| Oct. 1, 2003 | Dec. 31, 2003 | 103 | 4 |
| Time bucket monthly | | | |
| Jan. 1, 2003 | Jan. 31, 2003 | 103 | 1 |
| Feb. 1, 2003 | Feb. 28, 2003 | 103 | 2 |
| Mar. 1, 2003 | Mar. 31, 2003 | 103 | 3 |
| Apr. 1, 2003 | Apr. 30, 2003 | 103 | 4 |
| May 1, 2003 | May 31, 2003 | 103 | 5 |
| Jun. 1, 2003 | Jun. 30, 2003 | 103 | 6 |
| Jul. 1, 2003 | Jul. 31, 2003 | 103 | 7 |
| Aug. 1, 2003 | Aug. 31, 2003 | 103 | 8 |
| Sep. 1, 2003 | Sep. 30, 2003 | 103 | 9 |
| Oct. 1, 2003 | Oct. 31, 2003 | 103 | 10 |
| Nov. 1, 2003 | Nov. 30, 2003 | 103 | 11 |
| Dec. 1, 2003 | Dec. 31, 2003 | 103 | 12 |

According to the present example, the transaction manager has the following configuration settings:
Time bucket=Monthly
Total customer key segments=3
Balance caching method=in memory Balance According to the present example, the following transactions are to be loaded as part of batch 1. The data is split into the following three tables to simplify representing it for purposes of the present example.

TABLE 1

Customer Key segments and Posted date information

| Id | Company | Sales Person | Product | Posted date |
|---|---|---|---|---|
| 1 | 1 | 1 | 1 | Jan. 1, 2003 |
| 2 | 1 | 1 | 2 | Jan. 2, 2003 |
| 3 | 1 | 2 | 1 | Jan. 1, 2003 |
| 4 | 1 | 2 | 1 | Jan. 5, 2003 |

TABLE 1-continued

Customer Key segments and Posted date information

| Id | Company | Sales Person | Product | Posted date |
|---|---|---|---|---|
| 5 | 1 | 2 | 1 | Jan. 6, 2003 |
| 6 | 1 | 3 | 3 | Jan. 10, 2003 |
| 7 | 1 | 3 | 3 | Jan. 10, 2003 |
| 8 | 1 | 3 | 3 | Jan. 10, 2003 |
| 9 | 1 | 3 | 3 | Jan. 20, 2003 |
| 10 | 1 | 1 | 2 | Jan. 25, 2003 |

TABLE 2

Amount information

| Id | Orig Amount | Orig Amount currency | Home1 Amount | Home1 Amount currency | Home2 Amount | Home2 Amount currency |
|---|---|---|---|---|---|---|
| 1 | 100 | 1 | 100 | 1 | 180 | 2 |
| 2 | 100 | 1 | 100 | 1 | 180 | 2 |
| 3 | 200 | 2 | 120 | 1 | 200 | 2 |
| 4 | 200 | 2 | 120 | 1 | 200 | 2 |
| 5 | 200 | 2 | 120 | 1 | 200 | 2 |
| 6 | 500 | 3 | 600 | 1 | 1000 | 2 |
| 7 | 500 | 3 | 600 | 1 | 1000 | 2 |
| 8 | 500 | 3 | 600 | 1 | 1000 | 2 |
| 9 | 500 | 3 | 600 | 1 | 1000 | 2 |
| 10 | 100 | 1 | 100 | 1 | 180 | 2 |

TABLE 3

Non currency system key segment information

| Id | Scenario | Posting status | Balance type | Adjustment status |
|---|---|---|---|---|
| 1 | 1 | 1 | 2 | 1 |
| 2 | 1 | 1 | 2 | 1 |
| 3 | 1 | 1 | 2 | 1 |
| 4 | 1 | 1 | 2 | 1 |
| 5 | 1 | 1 | 2 | 1 |
| 6 | 1 | 1 | 2 | 1 |
| 7 | 1 | 1 | 2 | 1 |
| 8 | 1 | 1 | 2 | 1 |
| 9 | 1 | 1 | 2 | 1 |
| 10 | 1 | 1 | 2 | 1 |

According to the present example, when the above transaction data is loaded into the transaction manager, the following Keys, Facts, and amount attributes are created.

| Keys | | | |
|---|---|---|---|
| DP | Company | Sales Person | Product |
| 1 | 1 | 1 | 1 |
| 2 | 1 | 1 | 2 |
| 3 | 1 | 2 | 1 |
| 4 | 1 | 3 | 3 |

| Amount Attribute | | | | | | |
|---|---|---|---|---|---|---|
| Amount Attribute Id | Scenario | Balance type | Posting status | Adjustment status | Originating currency | Amount currency |
| 1 | 1 | 1 | 1 | 1 | 1 | 1 |
| 2 | 1 | 1 | 1 | 1 | 1 | 2 |
| 3 | 1 | 1 | 1 | 1 | 2 | 1 |
| 4 | 1 | 1 | 1 | 1 | 2 | 2 |
| 5 | 1 | 1 | 1 | 1 | 3 | 1 |
| 6 | 1 | 1 | 1 | 1 | 3 | 2 |
| 7 | 1 | 1 | 1 | 1 | 3 | 3 |

| Facts before aggregation | | | | | |
|---|---|---|---|---|---|
| DP | Amount attribute Id | Amount | Fiscal Year | Fiscal period | Calendar Id |
| 1 | 1 | 100 | 103 | 1 | 1 |
| 1 | 2 | 180 | 103 | 1 | 1 |
| 2 | 1 | 100 | 103 | 1 | 1 |
| 2 | 2 | 180 | 103 | 1 | 1 |
| 3 | 3 | 120 | 103 | 1 | 1 |
| 3 | 4 | 200 | 103 | 1 | 1 |
| 3 | 3 | 120 | 103 | 1 | 1 |
| 3 | 4 | 200 | 103 | 1 | 1 |
| 3 | 3 | 120 | 103 | 1 | 1 |
| 3 | 4 | 200 | 103 | 1 | 1 |
| 4 | 5 | 600 | 103 | 1 | 1 |
| 4 | 6 | 1000 | 103 | 1 | 1 |
| 4 | 7 | 500 | 103 | 1 | 1 |
| 4 | 5 | 600 | 103 | 1 | 1 |
| 4 | 6 | 1000 | 103 | 1 | 1 |
| 4 | 7 | 500 | 103 | 1 | 1 |
| 4 | 5 | 600 | 103 | 1 | 1 |
| 4 | 6 | 1000 | 103 | 1 | 1 |
| 4 | 7 | 500 | 103 | 1 | 1 |
| 2 | 1 | 100 | 103 | 1 | 1 |
| 2 | 2 | 180 | 103 | 1 | 1 |

| Facts after aggregation (the data stored in the fact binary files) | | | | | |
|---|---|---|---|---|---|
| DP | Amount attribute Id | Amount | Fiscal Year | Fiscal period | Calendar Id |
| 1 | 1 | 100 | 103 | 1 | 1 |
| 1 | 2 | 180 | 103 | 1 | 1 |
| 2 | 1 | 200 | 103 | 1 | 1 |
| 2 | 2 | 360 | 103 | 1 | 1 |
| 3 | 3 | 360 | 103 | 1 | 1 |
| 3 | 4 | 600 | 103 | 1 | 1 |
| 4 | 5 | 1800 | 103 | 1 | 1 |
| 4 | 6 | 3000 | 103 | 1 | 1 |
| 4 | 7 | 1500 | 103 | 1 | 1 |

Example #3

Query Processing

The following illustrates an example of how an enterprise-level analysis and reporting system processes a query according to one embodiment of the present invention and based on the data loaded in Example #2 above.
Query 1: Total Sold by Sales Persons 1,2,3 in 2003 in USD
Customer Key of query=sales persons 1,2,3
Date range—Fiscal year 103, Fiscal period 1 . . . 12 (as this includes the complete year)
Amount currency=USD
DPs that satisfy customer key={1,2,3,4}
Amount attribute that satisfy USD={1,3,5}
Total amount for DPs {1,2,3,4}, Amount attribute={1,3, 5} And fiscal year 103, fiscal period 1=100+200+360+1800=2460.
Result=2460.
Creating balance records for query 1.
Balance Key=Sales Persons 1,2,3
DPList={1,2,3,4}
Timebucket=yearly
Balance[ ]=the following table

| BP | Amount attribute Id | Amount | Fiscal Year | Fiscal period | Calendar Id |
|---|---|---|---|---|---|
| 1 | 1 | 300 | 103 | 1 | 1 |
| 1 | 2 | 540 | 103 | 1 | 1 |
| 1 | 3 | 360 | 103 | 1 | 1 |
| 1 | 4 | 600 | 103 | 1 | 1 |
| 1 | 5 | 1800 | 103 | 1 | 1 |
| 1 | 6 | 3000 | 103 | 1 | 1 |
| 1 | 7 | 1500 | 103 | 1 | 1 |

This looks just like the fact table, but imagine that the same set of data is received for February 2003 as part of loading the next batch of data.
Then, resultant fact table would look like this:

| DP | Amount attribute Id | Amount | Fiscal Year | Fiscal period | Calendar Id |
|---|---|---|---|---|---|
| 1 | 1 | 100 | 103 | 1 | 1 |
| 1 | 2 | 180 | 103 | 1 | 1 |
| 2 | 1 | 200 | 103 | 1 | 1 |
| 2 | 2 | 360 | 103 | 1 | 1 |
| 3 | 3 | 360 | 103 | 1 | 1 |
| 3 | 4 | 600 | 103 | 1 | 1 |
| 4 | 5 | 1800 | 103 | 1 | 1 |
| 4 | 6 | 3000 | 103 | 1 | 1 |
| 4 | 7 | 1500 | 103 | 1 | 1 |
| 1 | 1 | 100 | 103 | 2 | 1 |
| 1 | 2 | 180 | 103 | 2 | 1 |
| 2 | 1 | 200 | 103 | 2 | 1 |
| 2 | 2 | 360 | 103 | 2 | 1 |
| 3 | 3 | 360 | 103 | 2 | 1 |
| 3 | 4 | 600 | 103 | 2 | 1 |
| 4 | 5 | 1800 | 103 | 2 | 1 |
| 4 | 6 | 3000 | 103 | 2 | 1 |
| 4 | 7 | 1500 | 103 | 2 | 1 |

Once the load is complete the resultant balance table for BP 1 would look like this

| BP | Amount attribute Id | Amount | Fiscal Year | Fiscal period | Calendar Id |
|---|---|---|---|---|---|
| 1 | 1 | 600 | 103 | 1 | 1 |
| 1 | 2 | 1080 | 103 | 1 | 1 |
| 1 | 3 | 720 | 103 | 1 | 1 |
| 1 | 4 | 1200 | 103 | 1 | 1 |
| 1 | 5 | 3600 | 103 | 1 | 1 |
| 1 | 6 | 6000 | 103 | 1 | 1 |
| 1 | 7 | 3000 | 103 | 1 | 1 |

As the balances are aggregated on a yearly basis the data for month of January and February are aggregated in the balance table.
Now, when Query 1 is executed again (i.e., Total Sold by Sales Persons 1,2,3 in 2003 in USD)
=Aggregate of Amount attribute 1,3,5 for fiscal year 2003, period 1, time bucket yearly as defined in the balances for BP=1
=600+720+3600=4920

What is claimed is:

1. A computer-implemented method comprising:

hierarchically representing financial data within a financial transaction system by way of a fact data structure, a balance data structure and a cube data structure, the fact data structure storing fact values each of which aggregate multiple transactions, the balance data structure storing balance values each of which aggregate a plurality of transactions and the cube data structure storing cube slices each of which summarize balance values for a reporting unit of a plurality of reporting units of an organizational hierarchy;

interactively updating a folio on-demand for the organizational hierarchy with aggregated information from pre-summarized balances by responsive to user-generated folio-level queries which depend upon balance values not currently stored within the financial transaction system, dynamically creating and populating, by a balance manager, a plurality of instances of balance data structures (balances) with the new balance values based on transactions encompassed by the user-generated folio-level query;

responsive to availability of new transaction data upon which one or more of the balance values of the balances depend, maintaining, by the balance manager, clean balance values within the one or more balances by regenerating the one or more balance values; and responsive to a user-generated folio-level query, dynamically creating and populating, by a cube manager, an instance of a cube data structure (a cube) having dimensions defined by parameters of the user-generated folio-level query and which aggregates the balance values of the balances into appropriate slices of the cube; and wherein the balance manager and the cube manager are implemented in one or more processors of one or more computer systems and one or more computer-readable storage media of the one or more computer systems, the one or more computer-readable storage media having instructions tangibly embodied therein representing the balance manager and the cube manager that are executable by the one or more processors.

2. The method of claim 1, wherein the balances are stored in an in-process memory store of the balance manager.

3. The method of claim 2, wherein the in-process memory store comprises Address Windowing Extensions (AWE) memory.

4. The method of claim 1, wherein the cube is stored in an in-process memory store of the cube manager.

5. The method of claim 4, wherein the in-process memory store comprises Address Windowing Extensions (AWE) memory.

6. The method of claim 1, wherein a transaction of the plurality of transactions represents a line item in a financial reporting instance document.

7. The method of claim 6, wherein the financial reporting instance document comprises an Extensible Business Reporting Language (XBRL) instance document.

8. The method of claim 6, wherein the folio comprises a spreadsheet.

9. The method of claim 6, wherein the spreadsheet comprises a Microsoft® Excel spreadsheet including a separate worksheet for each reporting unit of the plurality of reporting units.

10. The method of claim 8, wherein the user-generated folio-level queries comprise refresh data requests initiated from within a toolbar or menu option of the spreadsheet.

11. The method of claim 6, wherein the financial transaction system comprises:

an analytical aggregation unit (AAU) computer system within which the balance manager and the cube manager are executing; and an analytical access point (AAP) computer system operable to convey the user-generated folio-level queries to the AAU computer system.

12. The method of claim 11, wherein the AAP computer system supports a plurality of users each running a spreadsheet application.

13. The method of claim 11, wherein the AAP computer system is logically interposed between a plurality of client computer systems each running a spreadsheet application, and the AAU computer system.

14. The method of claim 13, wherein the AAP computer is located remote from the AAU computer system.

15. A non-transitory program storage device readable by a computer system, tangibly embodying a program of instructions executable by one or more processors of the computer system to perform a method of interactively updating a folio on-demand for an organizational hierarchy, said method comprising:

hierarchically representing financial data within a financial transaction system by way of a fact data structure, a balance data structure and a cube data structure, the fact data structure storing fact values each of which aggregate multiple transactions, the balance data structure storing balance values each of which aggregate a plurality of transactions and the cube data structure storing cube slices each of which summarize balance values for a reporting unit of a plurality of reporting units of the organizational hierarchy;

interactively updating the folio on-demand for the organizational hierarchy with aggregated information from pre-summarized balances by responsive to user-generated folio-level queries which depend upon balance values not currently stored within the financial transaction system, dynamically creating and populating, by a balance manager, a plurality of instances of balance data structures (balances) with the new balance values based on transactions encompassed by the user-generated folio-level query;

responsive to availability of new transaction data upon which one or more of the balance values of the balances depend, maintaining, by the balance manager, clean balance values within the one or more balances by regenerating the one or more balance values; and responsive to a user-generated folio-level query, dynamically creating and populating, by a cube manager, an instance of a cube data structure (a cube) having dimensions defined by parameters of the user-generated folio-level query and which aggregates the balance values of the balances into appropriate slices of the cube.

16. The program storage device of claim 15, wherein the balances are stored in an in-process memory store of the balance manager.

17. The program storage device of claim 16, wherein the in-process memory store comprises Address Windowing Extensions (AWE) memory.

18. The program storage device of claim 15, wherein the cube is stored in an in-process memory store of the cube manager.

19. The program storage device of claim 18, wherein the in-process memory store comprises Address Windowing Extensions (AWE) memory.

20. The program storage device of claim 15, wherein a transaction of the plurality of transactions represents a line item in a financial reporting instance document.

21. The program storage device of claim 20, wherein the financial reporting instance document comprises an Extensible Business Reporting Language (XBRL) instance document.

22. The program storage device of claim 20, wherein the folio comprises a spreadsheet.

23. The program storage device of claim 20, wherein the spreadsheet comprises a Microsoft® Excel spreadsheet including a separate worksheet for each reporting unit of the plurality of reporting units.

24. The program storage device of claim 22, wherein the user-generated folio-level queries comprise refresh data requests initiated from within a toolbar or menu option of the spreadsheet.

\* \* \* \* \*